United States Patent
Teufel et al.

[11] 3,859,256
[45] Jan. 7, 1975

[54] HALOGENATED 3-(4'-BIPHENYLYL)-BUTANOLS

[75] Inventors: Helmut Teufel; Wolfhard Engel; Ernest Seeger, all of Biberach Riss, Germany

[73] Assignee: Boehringer Ingelheim GmbH, Ingelheim am Rhine, Germany

[22] Filed: Aug. 13, 1973

[21] Appl. No.: 387,802

[30] Foreign Application Priority Data
Aug. 17, 1972 Germany............................ 2240440

[52] U.S. Cl....... 260/618 D, 260/343.6, 260/348 R, 260/469, 260/473 A, 260/515 A, 260/515 R, 260/520, 260/544 M, 260/546, 260/592, 260/599, 260/611 A, 260/618 H, 260/618 R, 260/665 G, 424/343
[51] Int. Cl............................................. C07c 31/14
[58] Field of Search................................. 260/618 D

[56] References Cited
UNITED STATES PATENTS
3,801,654  4/1974  Seeger et al. .................. 260/618 R

*Primary Examiner*—Joseph E. Evans
*Assistant Examiner*—D. B. Springer
*Attorney, Agent, or Firm*—Hammond & Littell

[57] ABSTRACT

(4-Biphenylyl)-alcohols of the formula

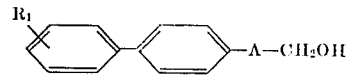

wherein A is one of the following divalent radicals:

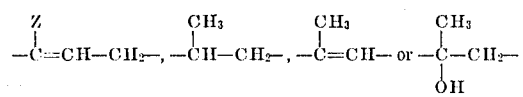

where Z is hydrogen or methyl, and $R_1$ is halogen or also hydrogen when A is

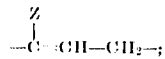

as well as methods of combatting inflammation utilizing an antiphlogistic amount of the above (4-biphenylyl)-alcohols.

3 Claims, No Drawings

HALOGENATED 3-(4'-BIPHENYLYL)-BUTANOLS

OBJECTS OF THE INVENTION

An object of the present invention is the development of novel antiphlogistically active (4-biphenylyl)-alcohols.

Another object of the present invention is the development of a (4-biphenylyl)-alcohol of the formula

wherein A represents a divalent radical selected from the group consisting of

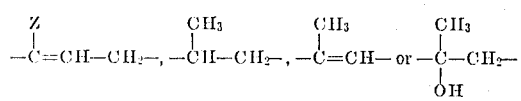

Z represents a member selected from the group consisting of hydrogen and methyl, and $R_1$ represents a member selected from the group consisting of halogen and, when A is

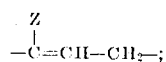

hydrogen.

A further object of the invention is the development of a method of counteracting inflammation in a warm-blooded animal, which comprises administering to said warm-blooded animal an effective antiphlogistic amount of one or more of the above (4-biphenylyl)-alcohols.

These and other objects of the invention will become more apparent as the description thereof proceeds.

DESCRIPTION OF THE INVENTION

The invention relates to new (4-biphenylyl)-alcohols of general formula I.

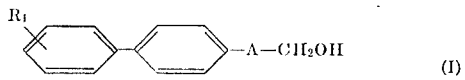

and to processes for their utilization. The compounds of general formula I possess valuable pharmacological properties, in general they show a good antiphlogistic activity.

In the above formula I A represents one of the divalent radicals

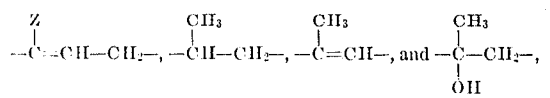

wherein Z may be a hydrogen atom or the methyl group, and $R_1$ represents a halogen atom or also a hydrogen atom, if A represents the group

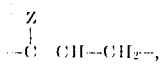

The new compounds may be prepared according to the following methods.

Method A

A compound of general formula II

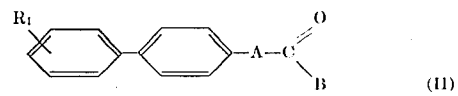

wherein in formula II A and $R_1$ are defined as above and B represents a hydroxy, alkoxy, aralkoxy, aryloxy or acyloxy group or a halogen atom, is reduced by means of complex hydrides. Suitable complex hydrides include, for example, the complex metal hydrides such as lithium aluminum hydride, lithium boron hydride or alkoxy aluminium hydrides, such as sodium-bis-(2-methoxyethoxy)-dihydroaluminate, or also sodium borohydride together with anhydrous aluminium chloride or with boron trifluoride. Compounds of general formula II, wherein A has the above meanings and B represents a halogen atom, may also be reduced with sodium boron hydride only.

The reduction is carried out in a suitable inert organic solvent like tetrahydrofuran, ether, dimethoxyethane, diethylene glycol dimethyl ether, benzene or in mixtures thereof at temperatures between 0°C and the boiling point of the solvent used, preferably at temperatures between 0° and 30°C.

Some starting compounds of general formula II are disclosed in the copending U.S. Pat. Application Ser. No. 289,008, filed Sept. 14, 1972.

Method B

Compounds of general formula I, wherein A represents the

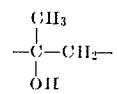

or the

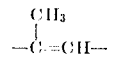

group, may also be reduced catalytically to the corresponding compounds of general formula I, wherein A represents the group

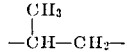

Preferred catalysts include noble metal catalysts, for example, palladium on coal or, if A represents the group

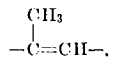

Raney metals such as Raney nickel or Raney cobalt. The reduction is generally carried out in a solvent, for example in an alcohol such as ethanol at temperatures between 0° and 100°C, preferably, however, at room temperature and at a hydrogen pressure from 1 to 100 atm., preferably from 3 to 10 atm.

Compounds of general formula I, wherein A represents the

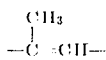

group, may also be reduced with nascent hydrogen, produced by reaction of magnesium on methanol. The reduction is advantageously carried out at temperatures up to the boiling point of the solvent used, preferably, however, at room temperature.

Method C

For the preparation of compounds of general formula I, wherein A represents the

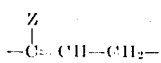

group, compounds of general formula III,

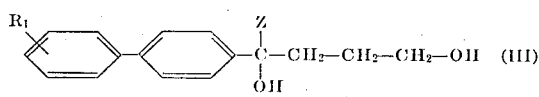

wherein Z and $R_1$ are defined as above are dehydrated in the presence of a dehydrating agent. As dehydrating agent, especially hydrogen halide salts of tertiary organic bases may be considered. The tertiary organic bases, for example, pyridine, alkylpyridine, N,N-dialkylaniline or N-alkylpiperidine have proved to be suitable, and as hydrogen halides especially hydrogen chloride and hydrogen bromide may be mentioned. Especially preferred as dehydrating agent is pyridine hydrochloride. The reaction may be carried out without a solvent, in some cases, however, the presence of a solvent is preferred. The compound of general formula III with the dehydrating agent, is heated up to temperatures between 100° to 200°C. Suitable solvents include toluene, xylene or dichlorobenzene.

Some starting compounds of general formula III are disclosed in the copending U.S. Pat. Application Ser. No. 295,880, filed Oct. 10, 1972.

Method D

Compounds of general formula I, wherein radical A represents the

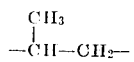

group, may also be prepared by hydrogenolysis of ethers of general formula IV,

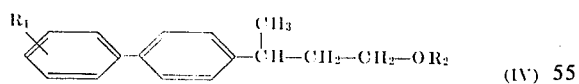

wherein $R_1$ is defined as above and $R_2$ represents an optionally substituted benzyl, benzhydryl or trityl group. The hydrogenolysis is carried out in a polar solvent by means of catalytically activated hydrogen. For example an alcohol such as methanol has proven to be suitable as solvent. As catalyst for example palladium on charcoal in the presence of glacial acetic acid may be used. The reaction is performed at room temperature or at elevated temperatures up to 100°C and at a hydrogen pressure of 1 to 50 atm., preferably of 5 atm.

Method E

Compounds of general formula I, wherein radical A represents the

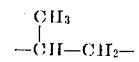

group, may also be prepared by reaction of metal organic compounds of general formula V,

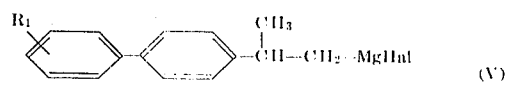

wherein $R_1$ is defined as above and Hal represents a chlorine, bromine or iodine atom, with formaldehyde or paraformaldehyde. The reaction is carried out in solvents suitable for Grignard reactions, e.g. in ethers such as diethylether or dioxan at room temperature or temperatures up to the boiling point of the solvent used.

Method F

Compounds of general formula I, wherein A represents the

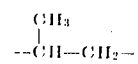

group, may also be prepared by reduction of aldehydes of general formula IIa,

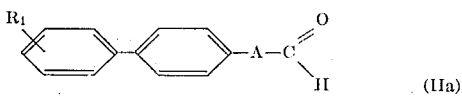

wherein A has the above meaning. The reduction is effected by catalytical hydrogenation, preferably by means of platinum or Raney nickel catalysts in solvents such as methanol or ethanol at temperatures up to 100°C and a hydrogen pressure between normal pressure and 100 atm. The aldehydes may on the other hand advantageously be reduced with complex metal hydrides, e.g. sodium boron hydride in ethanol or lithium aluminium hydride in ether or tetrahydrofuran at temperatures from 0°C up to the boiling point of the solvent used. Furthermore, also nascent hydrogen e.g. from sodium amalgam in an aqueous solution or from sodium in ethanol may be used for the reduction. The further processing is effected according to known methods.

The compounds of general formula II, used as starting materials, wherein A represents the

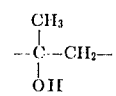

group and B an alkoxy or aralkoxy group are for example obtained by reaction of ketones of general formula VI,

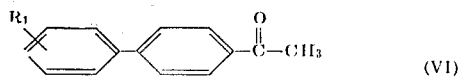

wherein $R_1$ has the above meaning, with the zinc compound of a corresponding halogen acetic acid ester.

The reaction is for example carried out in an ethereal solution at temperatures between 20° to 30°C. By saponification of the obtained ester, for example with an alkali lye, the alkali salt of the compound of general formula II was obtained, wherein B represents the hydroxy group.

The compounds of general formula II, wherein A is the

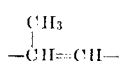

group and B represents a hydroxy, alkoxy, aralkoxy, aryloxy group, may be obtained by dehydration of compounds of general formula II, wherein A is the

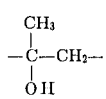

group. As dehydrating agents, acidically reacting salts like those of pyridine or alkylpyridine with hydrohalogen acids, furthermore potassium hydrogen sulfate or metal salts like zinc chloride or acids like p-toluenesulfonic acid, phosphoric acid, sulfuric acid or acid chlorides like phosphorus oxychloride, may be considered. The reaction is generally carried out in an inert solvent like toluene, benzene or xylene at temperatures up to the boiling temperature of the solvent used.

The starting compounds of general formula II, wherein A represents the

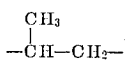

group, may be prepared by reduction of compounds of general formula II, wherein A represents the

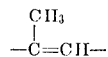

group. The reduction may for example be effected catalytically, whereby a noble metal oxide like platinic oxide is used. The reaction is appropriately carried out in a solvent, such as methanol or ethanol, preferably at temperatures between 20° and 100°C and at moderately elevated pressure, e.g. at 2 to 10 atm.

The starting compounds of general formula II, wherein A represents the group

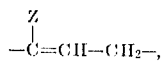

may be prepared from compounds of general formula VII,

or from lactones of general formula VIIa

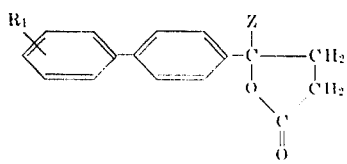

where $R_1$, Z and B are defined above, by dehydration in the presence of hydrogen halide salts of tertiary organic bases. The dehydration is carried out at temperatures between 140° and 200°C. As tertiary organic bases for example pyridine and alkyl pyridine and hydrohalogen acid, hydrochloric acid may be used.

If A represents one of the groups

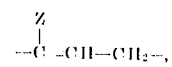

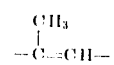

or

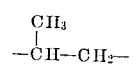

the acid halogenides may be prepared from the compounds of general formula II, wherein B represents the hydroxy group, according to usual methods, e.g. by treatment with phosphorus halogenides or thionylchloride.

The compounds of general formula VII, wherein Z represents the methyl group and B the hydroxy group, may for example be obtained from the corresponding lactones of general formula VIIa. These lactones were represented by condensation of a succinic acid ester with a correspondingly substituted 4-biphenylyl-methyl-ketone in the presence of an alkalialcoholate and subsequent saponification and decarboxylation of the obtained semi-ester (see Johnson et al Org. Reactions 6, 1 [1951]).

The compounds of general formula II, wherein radical A represents the

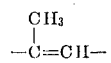

group, can also be obtained by condensation of an aldehyde of general formula VIII,

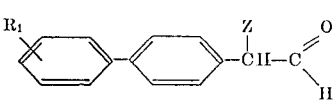

with malonic acid in the presence of pyridine or piperidine, first at room temperature, then at temperatures up to the boiling point of pyridine. The aldehydes of general formula VIII may for example be obtained by glycideester-condensation according to Darzens-Erlenmeyer-Claisen or, if Z represents a methyl group, by isomerization of oxiranes of general formula IX,

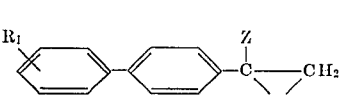

in the presence of boron trifluoride etherate. The oxiranes of general formula IX are for example obtained by reaction of dimethyl sulfonium methylide with corresponding 4-biphenylyl methyl ketones.

The starting compounds of general formula III, wherein Z is a hydrogen atom, are for example obtained by reduction by means of complex hydrides of 4-(4-biphenylyl)-4-oxo-butyric acid esters. As complex hydride especially sodium boron hydride in the presence of anhydrous aluminium chloride at room temperature and in the presence of a suitable solvent like dioxan may be used.

The starting compounds of general formula III, wherein Z is the methyl group, may for example be obtained by reduction of a lactone of general formula VIIa by means of complex metal hydrides, for example by means of lithium boron hydride or lithium aluminum hydride. The reduction is carried out in a solvent like tetrahydrofuran or ether at temperatures up to the boiling point of the solvent used.

The starting compounds of general formula IV may for example be prepared in the following way. A 4-biphenyl-3-halogenpropiophenone of general formula X,

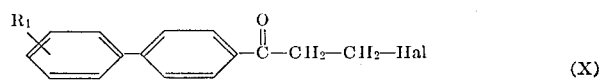
(X)

wherein Hal represents a halogen atom, preferably a chlorine or bromine atom, is reacted with an alcohol of general formula XI, $$R_2\text{—OH}$$

(XI)

wherein $R_2$ is as hereinbefore defined, to give an ether of general formula XII,

(XII)

The reaction is carried out at temperatures between 80° and 150°C. The ether of general formula XII is subsequently converted into a [3-(4-biphenylyl)-3-hydroxy-1-butyl]-ether of general formula XIII,

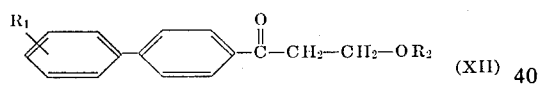
(XIII)

with a methyl magnesium halogenide, e.g. with methyl magnesium iodide, in absolute ether at reflux temperature. The ether of general formula XIII was finally reduced to an ether of general formula IV by means of catalytical activated hydrogen. Especially preferred is the reduction in glacial acetic acid by addition of perchloric acid, as catalyst palladium on barium sulfate was used. The reaction is carried out at temperatures between 20° and 80°C, preferably between 30° to 50°C, and a pressure of 1 to 10 atm., preferably 5 atm. Aldehydes of general formula IIa,

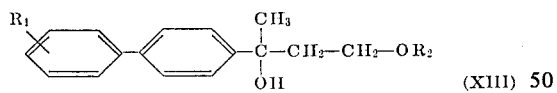
(IIa)

corresponding to general formula II, provided that A represents the group

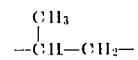

and B represents a hydrogen atom, may be obtained according to known methods, for example, by reduction of a nitrile of general formula XV.

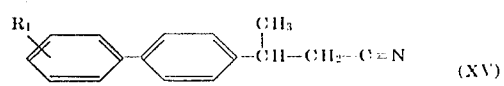
(XV)

The nitrile of general formula XV is for example reduced with an equimolar quantity of a complex metal hydride such as lithium aluminium tri-tert.-butoxyhydride in solvents like tetrahydrofuran at temperatures between —70° and +20°C. The aldehyde was recovered by hydrolysis with water or diluted acids (see Brown et al., Tetrahedron Letters 3, 9 (1959)).

The halogen compounds of the starting materials of general formula V are obtained according to methods known from the literature, e.g. from the corresponding carbinols.

The new compounds of general formula I possess valuable pharmacological properties, especially they show a good antipholgistic activity.

For pharmaceutical application, the new compounds of general formula I may be incorporated into the usual pharmaceutical compositions. The single dose amounts from 50 to 400 mg, preferably 150 to 600 mg. One pharmaceutical composition may, of course, contain 2 or more of such ingredients of general formula I.

The following examples further illustrate the invention without being limitative in any manner.

EXAMPLE 1

4-(4-biphenylyl)-3-buten-1-ol

A solution of 6.0 gm (0.025 mol) of 4-(4-biphenylyl-3-butenoic acid (m.p.: 188°C) in 100 ml of absolute tetrahydrofuran was dropwise stirred, at room temperature, into a suspension of 1.0 gm (0.026 mol) of lithium aluminium hydride in 100 ml of absolute ether. The mixture was stirred for a further 2 hours, then were successively added 1 ml of water, 2 ml of 2N sodium hydroxide solution and again 5 ml of water and the obtained precipitate was suction filtered. The solvent was distilled off from the filtrate, whereby the obtained firm residue was recrystallized from cyclohexane/ethyl acetate. A yield of 3.8 gm (68% of theory) of 4-(4-biphenylyl)-3-butan-1-ol was obtained (m.p.: 142°C). It was identified to be the compound of the formula

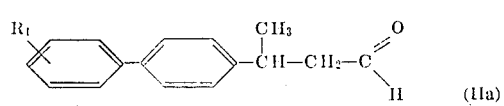

In the same manner 4-(20'-fluoro-4-biphenylyl)-3-buten-1-ol (m.p.: 79° to 80°C) was obtained from 4-(2'-fluoro-4-biphenylyl)-3-butenoic acid (m.p.: 142° to 144°C) with a yield of 73% of theory. It was identified to be the compound of the formula

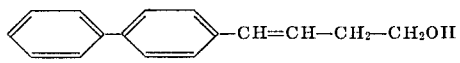

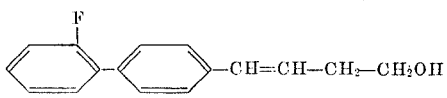

EXAMPLE 2

4-(2'-fluoro-4-biphenylyl)-3-buten-1-ol 8 gm (0.0307 mol) of 1-(2'-fluoro-4-biphenylyl)-1,4-butanediol and 32 gm of pyridine hydrochloride were heated while stirring for 30 minutes up to 160° to 165°C. Then water was added and the precipitated oil was absorbed in ether. The solvent was distilled off from the ethereal solution, which previously had been washed with water, dried and filtered over charcoal. 4 gm of a colorless oily residue were obtained, which was dissolved in 150 ml of petroleum ether at boiling. While cooling the colorless 4-(2'-fluoro-4-biphenylyl)-3-buten-1-ol (m.p.: 79° to 80°C) precipitated. Yield: 1,8 gm (24.4% of theory).

EXAMPLE 3

4-(4-biphenylyl)-3-buten-1-ol

A mixture of 12.1 gm (0.05 mol) of 4-(4-biphenylyl)-1, 4-butanediol and 48 gm of pyridine hydrochloride was heated for 15 minutes while stirring up to 150°C. The further processing was described in Example 2. 10 gm of crude product were obtained, which was dissolved in warm petroleum ether. On cooling, a colorless crystalline precipitate was obtained, which was suction filtered and recrystallized from cyclohexane. Yield: 3.6 gm (32.2% of theory) of 4-(4-biphenylyl)-3-buten-1-ol (m.p.: 142° to 143°C).

EXAMPLE 4

4-(2'-chloro-4-biphenylyl)-3-buten-1-ol 25.0 gm (0.09 mol) of 1-(2'-chloro-4-biphenylyl)-1,4-butanediol were heated for 30 minutes while stirring with 80 gm of pyridine hydrochloride up to 150°C. The further processing is described in Example 2. The crude product (15 gm) was dissolved in ethylene chloride and subject to chromatography through silica gel. Ethylene chloride was used as eluents. The first fraction was thrown away. The second fraction consisted of 4-(2'-chloro-4-biphenylyl)-3-buten-1-ol, which melted clearly at 70°C. A yield of 4 gm was obtained.

It was identified to be the compound of the formula

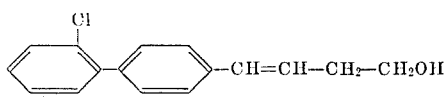

EXAMPLE 5

4-(2'-fluoro-4-biphenylyl)-3-buten-1-ol 6.5 gm (0.025 mol) of 1-(2'-fluoro-4-biphenylyl)-1,4-butanediol in 80 ml of xylene were refluxed with 2.9 gm of (0.025 mol) of pyridine hydrochloride for 10 minutes while removing water by a water separatory condenser. After cooling, 100 ml of ether were added, the mixture was extracted thrice with water, the organic layer was dried over sodium sulfate and the solvent was evaporated. The residue was recrystallized from petroleum ether.

Yield: 2.5 gm (41% of theory) of the above-mentioned butenol (m.p.: 79° to 80°C).

EXAMPLE 6

4-(2'-fluoro-4-biphenylyl)-3-buten-1-ol

A solution of 13.75 gm (0.05 mol) of 4-(2'-fluoro-4-biphenylyl)-3-butenoic acid chloride in 100 ml of 1,2-dimethoxyethane was dropped while stirring at 10° to 15°C to a suspension of 2.85 gm (0.075 mol) of sodium boron hydride in 100 ml of dimethoxyethane. The mixture was stirred for a further 2 hours at room temperature and then stirred into 400 ml of water. The precipitated oil was dissolved in ether, the ethereal solution was washed with ammonia and water, dried and the solvent was removed. The remaining residue was dissolved in 20 ml of cyclohexane/petroleum ether (1:1) mixture. After standing for some time, crystals were formed, which were suction filtered and recrystallized from cyclohexane/petroleum ether (1:1) mixture. Yield: 1.3 gm (10.7% of theory) of 4-(2'-fluoro-4-biphenylyl)-3-buten-1ol (m.p.: 76° to 78°C).

EXAMPLE 7

4-(2'-fluoro-4-biphenylyl)-3-penten-1-ol

A solution of 6.1 gm (0.021 mol) of the crude ethyl ester of 4-(2'-fluoro-4-biphenylyl)-3-pentenoic acid in about 500 ml of absolute ether was dropped within half an hour to a suspension of 1 gm (0.026 mol) of lithium aluminium hydride in 50 ml of absolute ether. After stirring for 2 hours at laboratory temperature the mixture was refluxed for 2 ½ hours. After cooling, first 1 ml of water, then 1 ml of 15% sodium hydroxide solution and then again 2 ml of water were carefully added for decomposition. The mixture was stirred for 1 to 1 ½ hours and filtered. From the filtrate 3.8 gm (83.7%) of 4-(2'-fluoro-4-biphenylyl)-3-penten-1-ol were obtained by evaporation and subsequent recrystallization from cyclohexane (m.p.: 102° to 102.5°C). It was identified to be the compound of the formula

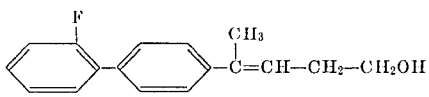

EXAMPLE 8

4-(4-biphenylyl)-3-penten-1-ol

By reduction of the ethyl ester of 4-(4-biphenylyl)-3-pentenoic acid analogous to Example 7, 4-(4-biphenylyl)-3-penten-1-ol (m.p.: 109° to 110.5°C) was obtained. It was identified to be the compound of the formula

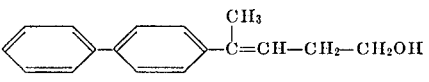

EXAMPLE 9

3-(2'-fluoro-4-biphenylyl)-butan-1-ol

A solution of 5 gm (0.02 mol) of 3-(2'-fluoro-4-biphenylyl)-butyric acid (m.p.: 98° to 99°C) in 25 ml of absolute ether was dropped while stirring at room temperature to a suspension of 0.95 gm (0.025 mol) of lithium aluminium hydride in 100 ml of absolute ether. The mixture was stirred for a further 15 minutes and then successively 1 ml water, 1 ml of 2N sodium hydroxide solution and again 3 ml of water were added. The obtained precipitate was suction filtered and thrown away. From the ethereal solution, which was extracted with water and dried, the solvent was distilled off, yielding 3 gm (61.5% of theory) of colorless 3-(2'-fluoro-4-biphenylyl)-butan-1-ol of b.p. 0.1 143° to 144°C. (m.p.: 56° to 57°C from petroleum ether). It was identified to be the compound of the formula

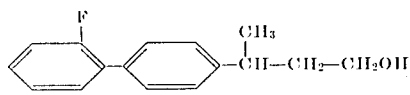

In the same manner 3-(2'-chloro-4-biphenylyl)-butan-1-ol was obtained having a b.p. $_{0.4}$ 158° to 159°C from 3-(2'-chloro-4-biphenylyl)-butyric acid (m.p.: 128° to 129°C) in a yield of 77% of theory. It was identified to be the compound of the formula

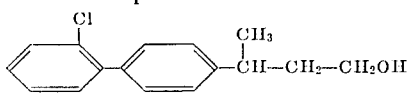

EXAMPLE 10

3-(2'-chloro-4-biphenylyl)-1,3-butanediol 14.5 gm (0.05 mol) of 3-(22'-chloro-4-biphenylyl)-3-hydroxy-butyric acid (m.p.: 103° to 104°C) were added by small amounts while stirring to a suspension of 2.28 gm (0.06 mol) of lithium aluminium hydride in 300 ml of absolute ether, while the mixture was cooled to about 0°C. Then stirring was continued for 2 hours at room temperature. After refluxing for further 30 minutes, successively 3 ml of water, 3 ml of 2N sodium hydroxide solution and again 9 ml of water were added. The precipitate was suction filtered and thrown away. The ethereal filtrate was washed with water, dried and the solvent was removed. The remaining solid residue was recrystallized from cyclohexane yielding 5.2 gm (37.6% of theory) of 3-(2'-chloro-4-biphenylyl)-1,3-butanediol of m.p.: 108° to 109°C. It was identified to be the compound of the formula

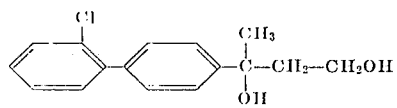

In the same manner 3-(2'-fluoro-4-biphenylyl)-1,3-butanediol was obtained having a b.p. $_{0.1}$ 170°C from the ethyl ester of 3-(2'-fluoro-4-biphenylyl)-3-hydroxy-butyric acid (m.p.: 73° to 75°C) in a yield of 76% of theory. It was identified to be the compound of the formula

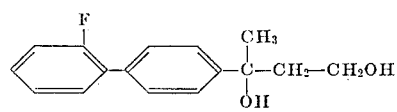

EXAMPLE 11

3-(2'-fluoro-4-biphenylyl)-2-buten-1-ol

A solution of 8.5 gm (0.03 mol) of the ethyl ester of 3-(2'-fluoro-4-biphenylyl)-2-butenoic acid (m.p.: 52° to 54°C) in 50 ml of absolute ether was dropped while stirring at room temperature into a suspension of 1.7 gm (0.045 mol) of lithium aluminium hydride in 150 ml of absolute ether. Afterwards stirring was continued for 90 minutes at room temperature, then successively 2 ml of water, 4 ml of 2N sodium hydroxide solution and again 10 ml of water were added and the precipitate was suction filtered and thrown away. The filtrate was washed with water, dried and the solvent was removed. yield: 6.2 gm (85.2% of theory) of 3-(2'-fluoro-4-biphenylyl)-2-buten-1-ol of m.p. 90°C. It was identified to be the compound of the formula

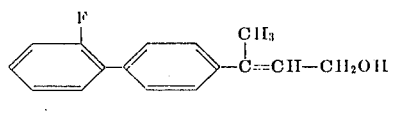

EXAMPLE 12

3-(2'-chloro-4-biphenylyl)-2-buten-1-ol

A solution of 15 gm (0.05 mol) of the ethyl ester of 3-(2'-chloro-4-biphenylyl)-2-butenoic acid (m.p.: 77° to 80°C) in 50 ml of absolute ether was dropped while stirring and cooling to 0° to 10°C into a suspension of 1.9 gm (0.05 mol) of lithium aluminium hydride in 200 ml of absolute ether. After finishing the addition the stirring was continued for 10 minutes while cooling, then successively 2 ml of water, 2 ml of 2N sodium hydroxide solution and again 6 ml of water were added. The obtained precipitate was suction filtered and thrown away. The solvent was evaporated from the filtrate. The remaining oil was purified by column chromatography through 200 gm of silica gel (0.2 to 0.5 mm) with the use of ethylene chloride as solvent. The residue remaining after evaporation of the ethylene chloride, was distilled yielding 5 gm (39% of theory) of 3-(2'-chloro-4-biphenylyl)-2-buten-1-ol of b.p. $_{0.2}$ 170° to 172°C. It was identified to be the compound of the formula

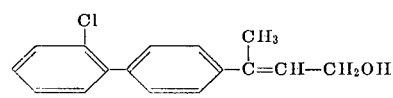

EXAMPLE 13

3-(2'-fluoro-4-biphenylyl)-butan-1-ol 2.4 gm (0.01 mol) of 3-(2'-fluoro-4-biphenylyl)2-buten-1-ol (m.p.: 91°C) were dissolved in 30 ml of methanol and hydrogenated at room temperature and at 5 atm. of pressure with the addition of 1.5 gm of Raney nickel as catalyst. After absorption of the calculated quantity of hydrogen, the catalyst was suction filtered off and the solvent distilled off. The remaining oily residue (2.4 gm) was distilled in vacuo, yielding 1.7 gm (71% of theory) of 3-(2'-fluoro-4-biphenylyl)-butan-1-ol of b.p. $_{0.05}$ 124° to 125°C.

EXAMPLE 14

3-(2'-fluoro-4-biphenylyl)-butan-1-ol 14.7 gm (0.050 mol) of 2-(2'-fluoro-4-biphenylyl)-1-bromopropane in 250 ml of anhydrous ether were reacted with 1.25 gm (0.053 mol) of magnesium shavings. To this solution an equimolar quantity (1.55 gm) of pulverized, dry paraformaldehyde was added. The solution was stirred for about 48 hours at laboratory temperature and subsequently refluxed for 2 hours.

After cooling, ice-water was added. The solution was acidified with 2N hydrochloric acid solution and processed in the usual way. The organic dry extract of the ethereal solution was distilled in medium high vacuum, yielding 4.8 gm of 3-(2'-fluoro-4-biphenylyl)-butan-1-ol, b.p. $_{0.08}$ 135° to 138°C (42% of theory).

EXAMPLE 15

3-(2'-fluoro-4-biphenylyl)-butan-1-ol 2.42 gm (0.01 mol) of 3-(2'-fluoro-4-biphenylyl)-2-buten-1-ol (m.p.: 91°C) and 4.38 gm (0.24 gram atom) of magnesium shavings were slightly heated while stirring in 50 ml of methanol. After beginning of the reaction stirring was continued without further heating until the magnesium had completely dissolved. The solvent was distilled off, the residue was decomposed with ammonium chloride solution and the precipitated oil was dissolved in ether. The residue, remaining after evaporation of the ether, is a colorless liquid of b.p. $_{0.15}$ 148° to 149°C, which is identical to 3-(2'-fluoro-4-biphenylyl)-butan-1-ol with regard to spectroscopy and to thin-layer chromatography.

EXAMPLE 16

3-(2'-fluoro-4-biphenylyl)-butan-1-ol 5.2 gm (0.02 mol) of 3-(2'-fluoro-4-biphenylyl)-1,3-butanediol (b.p. $_{0.1}$ 170° to 171°C) were hydrogenated at 50°C and at 5 atm. of pressure in 50 ml of methanol in the presence of 1 gm of palladium on coal (10%). After absorption of the calculated quantity of hydrogen, the catalyst was removed by suction filtration, the solvent was removed and the remaining residue was distilled. Yield: 4.1 gm (84% of theory) of 3-(2'-fluoro-4-biphenylyl)-butan-1-ol of b.p. $_{0.15}$ 148° to 149°C.

EXAMPLE 17

3-(3'-chloro-4-biphenylyl)-butan-1-ol

A solution of 8.5 gm (0.028 mol) of the ethyl ester of 3-(3'-chloro-4-biphenylyl)-butyric acid (b.p. $_{0.05}$ 148° to 151°C) in about 300 ml of absolute ether were dropped within an hour into a suspension of 0.08 gm (0.02 mol) of lithium aluminium hydride in 50 ml of ether and the solution was refluxed for 7 ½ hours. After cooling, successively 0.8 ml of water, 0.8 ml of 15% sodium hydroxide solution and again 2.4 ml of water were added. The mixture was stirred for 1 ½ hours and filtered. The ethereal solution was dried and evaporated. After distillation in medium high vacuum 7.2 gm of 3-(3'-chloro-4-biphenylyl)-butan-1-ol were obtained from the residue (b.p. 0.18 142° to 144°C; yield almost quantitative). It was identified to be the compound of the formula

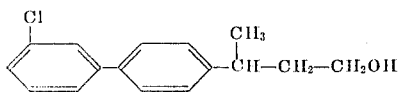

EXAMPLE 18

4-(2'-fluoro-4-biphenylyl)-pentan-1-ol

A solution of 6.0 gm (0.022 mol) of 4-(2'-fluoro-4-biphenylyl)-1,4-pentanediol (m.p. 108.5° to 109°C) in a 50 ml of methanol were hydrogenated in the presence of 1.5 gm of palladium coal (10%) at 50°C and at a hydrogen pressure of 5 atm. The catalyst was filtered off and the solution was evaporated. After distillation in medium high vacuum 5.4 gm of 4-(2'-fluoro-4-biphenylyl)-pentan-1-ol (b.p. $_{0.08}$ 138° to 140°C; yield: 95% of theory) were obtained. It was identified to be a compound of the formula

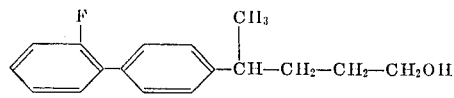

In the same manner 4-(4-biphenylyl)-pentan-1-ol (b.p. 0.14 152° to 155°C; yield: 97.5% of theory), was obtained by catalytical hydrogenation of 4-(4-biphenylyl)-1,4-pentanediol (m.p.: 136° to 137°C). It was identified to be a compound of the formula

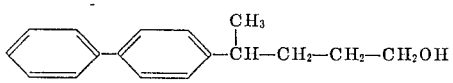

EXAMPLE 19

3-(20'-fluoro-4-biphenylyl)-butan-1-ol a. benzyl-[3-(2'-fluoro-4-biphenylyl)-3-oxo-1-propyl]-ether 39.3 gm (0.15 mol) of 4'-(2-fluoro-phenyl)-3-chloropropiophenone (m.p. 102°C) were heated with 170 ml of benzyl alcohol for 2 hours up to 120°C in an oil bath while stirring. Subsequently, the excess of benzyl alcohol was distilled off under a water jet vacuum. The remaining oily residue was extracted thrice with 200 ml of petroleum ether each time, the solvent was distilled off from the combined petroleum ether solutions. The remaining oily residue (32 gm), which cannot be distilled in an undecomposed state, was reacted without further purification.

b. benzyl-[3-(2'-fluoro-4-biphenylyl)-3-hydroxy-1-butyl]-ether

A solution of 16.5 gm (0.05 mol) of crude benzyl-[3-(2'-fluoro-4-biphenylyl)-3-oxo-1-propyl]-ether in 70 ml of absolute ether was dropped while stirring to a Grignard-solution of 1.85 gm (gram-atom) of magnesium powder and 11 gm (0.075 mol) of methyl iodide in 20 ml of absolute ether in such away that a slight reflux occurs. Afterwards the mixture was stirred and refluxed for further 30 minutes, decomposed with ice ammonium chloride and the ethereal layer was separated. The ethereal solution was dried and the solvent was removed. Yield: 18 gm of the above-mentioned compound as non-distillable oily residue.

c. 3-(2'-fluoro-4-biphenylyl)-butan-1-ol 17.5 gm (0.05 mol) of benzyl-[3-(2'-fluoro-4-biphenylyl)-3-hydroxy-1-butyl]-ether were hydrogenated in 100 ml of glacial acetic acid in the presence of 1 ml of perchloric acid with 3 gm of palladium on barium sulfate (5%) as catalyst at 40°C and 5 atm. of pressure. After absorption of the calculated quantity of hydrogen, the catalyst was removed by suction filtration and the solvent was distilled.

The remaining oily residue, consisting of the benzyl-ester of 3-(2'-fluoro-4-biphenylyl)-butan-1-ol, was dissolved for hydrogenolysis of the benzyl group in 50 ml of glacial acetic acid and 100 ml of methanol and hydrogenated in the presence of 2.5 gm of palladium on coal (10%) until the absorption of the calculated quantity of hydrogen was finished at room temperature and 5 atm. of pressure. After the catalyst had been removed by suction filtrating the solution was evaporated to one-quarter of its volume. It was then introduced into water and extracted with ether. The ethereal solution was washed with water, dried and the solvent was removed. The remaining oily residue consists almost completely of the acetic acid ester of 3-(2'-fluoro-4-biphenylyl)-butan-1-ol. The saponification of the ester is performed by heating for one hour with 7 ml of 30% sodium hydroxide solution in 30 ml of ethanol in the water bath. Subsequently, the solution was diluted with water and extracted with ether. The oily residue, remaining after the evaporation of the ether, was distilled in vacuo.
Yield: 5 gm (42% of theory) of 3-(2'-fluoro-4-biphenylyl)-butan-1ol of b.p. $_{0.2}$ 145°C.

EXAMPLE 20

3-(2'-fluoro-4-biphenylyl)-butan-1ol 0.46 gm (0.012 mol) of sodium borohydride were added by small amounts to a solution of 4.85 gm (0.020 mol) of 3-(2-fluoro-4-biphenylyl)-butyraldehyde (b.p. $_{0.04}$ 112° to 114°C) in 120 ml of ethanol at room temperature. The mixture was stirred for several hours and left standing overnight. Then about 3 ml of ethyl acetate and about 3 ml of acetone were added and the mixture was neutralized with diluted acetic acid after further stirring. After evaporation in vacuo, the remaining residue was dissolved in ether and water. The organic layer was separated, washed with sodium bicarbonate solution and water. The residue of the dried and evaporated ethereal solution was distilled in a medium high vacuum. Yield 3.5 gm (72% of theory) of 3-(2'-fluoro-4-biphenylyl)-butan-1-ol of b.p. 123° to 125°C (0.04 torr).

EXAMPLE 21

PHARMACOLOGY

The following compounds were tested according to their absolute antiphlogistic activity and their toxicity:

4-(2'-fluoro-4-biphenylyl)-3-buten-1-ol = A
and
4-(4-biphenylyl)-3-buten-1-ol = B The compounds were tested in respect of their antiexudative effect on the kaolin-induced edema and the carrageenin-induced edema of the hind paw of the rat and in respect of their acute toxicity after oral administration to rats, in comparison with phenylbutazone.

a. Kaolin-induced edema of the hind paw of the rat

The kaolin edema was induced according to the method given by HILLEBRECHT (Arzneimittel-Forsch. 4, 607 (1954)) by subplanatary injection of 0.05 ml of a 10% suspension of kaolin in a 0.85% sodium chloride solution. Measurement of the volume of the paws was effected using the technique of DOEPFNER and CERLETTI (Int. Arch. Allergy Immunol. 12, 89 (1958)).

Male FW 49 rats having an average weight of 120 to 150 gm were fed with the test compounds 30 minutes before inducing the edema by means of an oesophageal tube. 5 hours after the provocation of the edema the averaged values of the swelling caused in the rats treated with the test compounds were compared with values measured on control animals. By graphical extrapolation, the dose leading to a 35% reduction of the swelling ($ED_{35}$) was calculated from the percentage reduction values measured by the administration of different doses.

b. Carrageenin-induced edema of the hind paw of the rat

The provocation of the carrageenin edema was effected according to the method of WINTER et al (Proc. Soc. Exp. Biol. Med. 111, 544 (1962)) by subplantary injection of 0.05 ml of a 1% solution of carrageenin in a 0.85% solution of sodium chloride. The test compounds were administered 60 minutes before the provocation of the edema.

For the calculation of the reductive effect on the edema the values measured 3 hours after the provocation of the edema were used. All the other details were the same as described above in the case of the kaolin-induced edema.

c. Acute toxicity

After oral administration to male and female FW 49 rats (ratio 1:1) having an average weight of 135 gm, the acute toxicity ($LD_{50}$) was determined. The substances were fed as a trituration in Tylose.

The calculation of the $LD_{50}$ values was effected, as far as possible according to the method of LITCHFIELD and WILCOXON, based on the percentage of animals which died within 14 days after administration of the different doses.

d. Therapeutic Index

The therapeutical index (a measure for the therapeutic usefulness) was calculated as the quotient of the oral $LD_{50}$ and of the $Ed_{35}$ value calculated from the antiexudative effect (average value from the kaolin-edema and the carrageenin-edema).

The results obtained from the tests are recorded in the following Table I.

The above mentioned compounds surpass the known compound phenylbutazone in their antiphlogistic activity.

As the toxicity did not rise in proportion to the antiphlogistic effect, the compounds concerned have a therapeutic index of at least twice that of phenylbutazone.

TABLE I

| Compound | Kaolin Edema $ED_{35}$ per os mg/kg | Carrageenin Edema $ED_{35}$ per os mg/kg | Average Value $ED_{35}$ mg/kg | Acute Toxicity in the Rat | | Therapeutical Index |
|---|---|---|---|---|---|---|
| | | | | mg/kg | Confidence Limits (95% Probability) | Ratio Between Toxic and Antiexudative Activity $LD_{50}/ED_{35}$ |
| Phenylbutazone | 58 | 69 | 63.5 | 864 | 793–942 | 13.6 |
| A | 44 | 19 | 31.5 | 1770 | 1341–2326 | 56.2 |
| B | 42 | 50 | 46 | >2000 | * | >43.5 |

*0 out of 10 animals died after application of 2000 mg/kg per os

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective antiphlogistic dosage unit of the compounds according to the present invention is from 0.83 to 6.67 mgm/kg body weight, preferably 1.33 to 5.0 mgm/kg body weight. The daily dose rate is from 1.66 to 16.7 mgm/kg body weight, preferably 2.5 to 10 mgm/kg body weight.

The following examples illustrate a few pharmaceutical dosage unit compositions comprising a compound of the present invention as an active ingredient and represent the best modes contemplated of putting the invention into practical use. The parts are parts by weight unless otherwise specified.

EXAMPLE 22

Tablets with 200 mg of 4-(2'-fluoro-4-biphenylyl)-3-buten-1-ol

Composition:
1 tablet contains:
| | |
|---|---|
| Active ingredient | 200.0 mg |
| corn starch | 97.0 mg |
| polyvinylpyrrolidone | 10.0 mg |
| magnesium stearate | 3.0 mg |
| | 310.0 mg |

Method of preparation:

The active ingredient, 4-(2'-fluoro-4-biphenylyl)-3-buten-1-ol, was mixed with corn starch, granulated with a 14% solution of polyvinylpyrrolidone in water passed through a screen of 1.5 mm, dried at 45°C and passed once more through the said screen. The granulate thus obtained was mixed with magnesium stearate and pressed into tablets.

| | |
|---|---|
| Weight of tablet: | 310 mg |
| Punch: | 10 mm, flat |

EXAMPLE 23

Coated tablets with 200 mg of 4-(2'-fluoro-4-biphenylyl)-3-buten-1-ol

Composition:
1 coated tablet core contains:
| | |
|---|---|
| Active ingredient | 200.0 mg |
| corn starch | 70.0 mg |
| gelatine | 8.0 mg |
| talcum | 18.0 mg |
| magnesium stearate | 4.0 mg |
| | 300.0 mg |

Method of preparation:

The mixture of 4-(2'-fluoro-4-biphenylyl)-3-buten-1-ol and corn starch was granulated with an aqueous 10% solution of the gelatine through a 1.5 mm mesh screen, dried at 45°C and again passed through the said screen. The granulate thus obtained was admixed with talcum and magnesium stearate and compressed into coated tablet cores.

| | |
|---|---|
| Weight of core: | 300.0 mg |
| Punch: | 10.0 mm, arched |

The coated tablet cores were subsequently coated with a thin shell consisting essentially of a mixture of sugar and talcum and finally polished with beeswax. Weight of coated tablet: 580 mg

EXAMPLE 24

Gelatine capsules with 200 mg of 4-(2'-fluoro-4-biphenylyl)-3-buten-1-ol

Composition:
1 gelatine capsule contains:
| | |
|---|---|
| Active ingredient | 200.0 mg |
| corn starch | 190.0 mg |
| colloidal silicia acid | 6.0 mg |
| magnesium stearate | 4.0 mg |
| | 400.0 mg |

Method of preparation:

The substance were intimately mixed and filled into No. 1 gelatine capsules. 1 gelatine capsule contained 400 mg of the preparation and 200 mg of 4-(2'-fluoro-4-biphenylyl)-3-buten-1-ol, an oral dosage unit with an effective antiphlogistic action.

EXAMPLE 25

Suppositories with 300 mg of 3-(2'-fluoro-4-biphenylyl)-butan-1-ol

Composition:
1 suppository contains:
| | |
|---|---|
| Active ingredient | 300.0 mg |
| suppository mass-cocoa butter | 1,450.0 mg |
| (e.g. Witepsol W 45) | 1,750.0 mg |

Method of preparation:

The finely pulverized 3-(2'-fluoro-4-biphenylyl)-butan-1-ol was stirred into the molten suppository mass, and, after cooling to 40°C, was blended by means of an immersion homogenizer. The mass was poured into slightly precooled molds at 38°C. Weight of suppository: 1.75 g

EXAMPLE 26

Suspension with 200 mg of 3-(2'-fluoro-4-biphenylyl)-butan-1-ol

Composition:
| | | |
|---|---|---|
| Active ingredient | 4.0 | g |
| dioctyl sodium sulfosuccinate (DONSS) | 0.02 | g |
| benzoic acid | 0.1 | g |
| sodium cyclamate | 0.2 | g |
| colloidal silicia acid | 1.0 | g |
| polyvinylpyrrolidone | 0.1 | g |
| glycerine | 1.0 | g |
| grapefruit flavoring | 0.1 | g |
| distilled water | 100.0 | ml |

Method of preparation:

DONSS, benzoic acid, sodium cyclamate and polyvinylpyrrolidone were successively dissolved in distilled water heated to 70°C. Then glycerine and the colloidal silica acid were added. The solution was cooled to room temperature and the finely pulverized 3-(2'-fluoro-4-biphenylyl)-butan-1-ol was suspended by means of an immersion homogenizer. Subsequently, the mixture was flavored and made up with water to the given volume.

5 ml of the suspension contain 200 mg of the active ingredient.

EXAMPLE 27

Coated tablets with 100 mg of 3-(2'-fluoro-4-biphenylyl)-butan-1-ol

| Composition: | |
|---|---|
| Active ingredient | 100.0 mg |
| lactose | 55.0 mg |
| corn starch | 42.0 mg |
| polyvinylpyrrolidone | 2.0 mg |
| magnesium stearate | 1.0 mg |
| | 200.0 mg |

Method of preparation:

The mixture of 3-(2'-fluoro-4-biphenylyl)-butan-1-ol with lactose and corn starch was granulated with an aqueous 8% solution of the polyvinylpyrrolidone through a 1.5 mm mesh screen, dried at 45°C and passed through a 1.0 mm mesh screen. The granulate thus obtained was mixed with magnesium stearate and compressed into coated tablet cores.

| Weight of core: | 200 mg |
|---|---|
| Punch: | 8 mm, arched |

The coated tablet cores thus obtained were coated according to a known process with a thin shell consisting essentially of a mixture of sugar and talcum and finally polished with beeswax. Weight of coated tablet: 290 mg

EXAMPLE 28

Suppositories with 100 mg of 3-(2'-chloro-4-biphenylyl)-butan-1-ol

| Composition: | |
|---|---|
| 1 suppository contains: | |
| Active ingredient | 100.0 mg |
| suppository mass cocoa butter | 1,600.0 mg |
| (e.g., Witepsol W 45) | 1,700.0 mg |

Method of preparation:

The finely pulverized 3-(2'-chloro-4-biphenylyl)-butan-1-ol was stirred into the molten suppository mass, cooled to 40°C, blended by means of an immersion homogenizer and poured into slightly precooled molds at 36°C. Weight of suppository: 1.7 g

EXAMPLE 29

Gelatine capsules with 100 mg of 3-(2'-chloro-4-biphenylyl)-butan-1-ol

| Composition: | |
|---|---|
| 1 capsule contains: | |
| Active ingredient | 100.0 mg |
| corn starch dried | 200.0 mg |
| | 300.0 mg |

Method of preparation:

The substances were intensively mixed and filled into No. 4 gelatine capsules.

Content of capsule: 300 mg of which 100 mg was the active ingredient 3-(2'-chloro-4-biphenylyl)-butan-1-ol.

EXAMPLE 30

Suspension with 50 mg of 3-(2'-chloro-4-biphenylyl)-butan-1-ol

| Composition: | |
|---|---|
| Active ingredient | 1.0 g |
| dioctyl sodium sulfosuccinate (DONSS) | 0.01 g |
| benzoic acid | 0.1 g |
| sodium cyclamate | 0.2 g |
| veegum | 0.5 g |
| colloidal silica acid | 0.5 g |
| polyvinylpyrrolidone | 0.1 g |
| glycerine | 10.0 g |
| banana flavoring | 0.1 g |
| distilled water | 100.0 ml |

Method of preparation:

The DONSS was dissolved in approximately 15% of the indicated quantity of water and afterwards the finely pulverized 3-(2'-chloro-4-biphenylyl)-butan-1-ol was suspended therein. The remaining water was heated up to 80°C and the veegum and collodial silica acid were suspended therein. Subsequently the benzoic acid, sodium cyclamate and polyvinylpyrrolidone were dissolved therein and the glycerine was added. The solution was cooled to room temperature and flavored and the active ingredient suspension was stirred in. The finished preparation was homogenized. 5 ml of the suspension contain 50 mg of the active ingredient.

EXAMPLE 31

Tablets with 200 mg of 3-(2'-chloro-4-biphenylyl)-butan-1-ol

| Composition: | |
|---|---|
| Active ingredient | 200.0 mg |
| p-ethoxyacetanilide | 200.0 mg |
| lactose | 75.0 mg |
| corn starch | 100.0 mg |
| polyvinylpyrrolidone | 20.0 mg |
| magnesium stearate | 5.0 mg |
| | 600.0 mg |

Method of preparation: Analogous to Example 22.

| Weight of tablet: | 600 mg |
|---|---|
| Punch: | 13 mm, flat |

The 600 mg tablet contained 200 mg of 3-(2'-chloro-4-biphenylyl)-butan-1-ol, an oral dosage unit with an effective antiphlogistic action.

While the present invention has been illustrated with the aid of certain specific embodiments thereof, it will be readily apparent to those skilled in the art that the invention is not limited to the particular embodiments. Various changes and modifications may be made without departing from the spirit of the invention or the scope of the appended claims.

We claim:

1. A compound of the formula

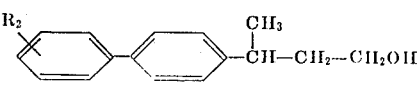

wherein
R₁ is halogen.

2. The compound of claim 1 which is 3-(2'-fluoro-4-biphenylyl)-butan-1-ol.

3. The compound of claim 1 which is 3-(2'-chloro-4-biphenylyl)-butan-1-ol.

* * * * *